(12) United States Patent
Dillinger

(10) Patent No.: US 10,875,432 B2
(45) Date of Patent: Dec. 29, 2020

(54) HEADREST FOR A VEHICLE SEAT AND SYSTEM FOR FORMING AN ALIGNMENT DEVICE WHICH CAN BE INTEGRATED IN A HEADREST

(71) Applicant: Adient Luxembourg Holding S.à r.l., Luxembourg (LU)

(72) Inventor: Thomas Dillinger, Ratingen (DE)

(73) Assignee: Adient Luxembourg Holding S.à r.l., Luxembourg (LU)

( * ) Notice: Subject to any disclaimer, the term of this patent is extended or adjusted under 35 U.S.C. 154(b) by 63 days.

(21) Appl. No.: 15/759,568

(22) PCT Filed: Sep. 15, 2016

(86) PCT No.: PCT/EP2016/071803
§ 371 (c)(1),
(2) Date: Mar. 13, 2018

(87) PCT Pub. No.: WO2017/046233
PCT Pub. Date: Mar. 23, 2017

(65) Prior Publication Data
US 2019/0152368 A1 May 23, 2019

(30) Foreign Application Priority Data
Sep. 15, 2015 (DE) .................. 10 2015 217 631

(51) Int. Cl.
*B60N 2/865* (2018.01)
*B60N 2/829* (2018.01)
*B60N 2/862* (2018.01)
*B60N 2/812* (2018.01)
*B60N 2/80* (2018.01)

(52) U.S. Cl.
CPC ............. *B60N 2/829* (2018.02); *B60N 2/812* (2018.02); *B60N 2/862* (2018.02); *B60N 2/865* (2018.02); *B60N 2002/899* (2018.02)

(58) Field of Classification Search
CPC ........ B60N 2/818; B60N 2/865; B60N 2/821; B60N 2/829
See application file for complete search history.

(56) References Cited

U.S. PATENT DOCUMENTS

| 7,717,517 B2 | 5/2010 | Yamane et al. |
| 8,141,945 B2 | 3/2012 | Akaike et al. |
| 2004/0262974 A1 * | 12/2004 | Terada .................. B60N 2/865 297/407 |

(Continued)

FOREIGN PATENT DOCUMENTS

| DE | 10047406 A1 * | 4/2002 | ............. B60N 2/888 |
| DE | 10202598 A1 * | 8/2003 | ............. B60N 2/888 |

(Continued)

*Primary Examiner* — Timothy J Brindley
(74) *Attorney, Agent, or Firm* — Marshall & Melhorn, LLC

(57) ABSTRACT

A headrest, for a vehicle seat, is reversibly transferable between a first latching position and a second latching position by a translation movement. The headrest has a shaft co-rotating with the translation movement. The shaft is connectable in the first latching position and in the second latching position to a latching element. The latching element is connected to the shaft via an elastic component. A system for forming an alignment device which can be integrated in a headrest is further provided.

10 Claims, 1 Drawing Sheet

(56) References Cited

U.S. PATENT DOCUMENTS

| | | | | |
|---|---|---|---|---|
| 2010/0109397 A1* | 5/2010 | Bandurksi | ............ | B60N 2/4279 |
| | | | | 297/216.12 |
| 2010/0127548 A1* | 5/2010 | Truckenbrodt | ........ | B60N 2/865 |
| | | | | 297/391 |
| 2015/0130248 A1* | 5/2015 | Line | ....................... | B60N 2/865 |
| | | | | 297/410 |
| 2016/0325652 A1* | 11/2016 | Ishihara | ................. | B60N 2/829 |
| 2017/0291515 A1* | 10/2017 | Soltner | .................... | B60N 2/80 |

FOREIGN PATENT DOCUMENTS

| | | | |
|---|---|---|---|
| DE | 102005059693 A1 * | 11/2006 | ............ B60N 2/888 |
| EP | 1 985 493 A2 | 10/2008 | |
| EP | 1985493 A2 | 10/2008 | |
| EP | 2 141 046 A1 | 1/2010 | |
| EP | 2141046 A1 | 1/2010 | |
| EP | 3372445 A1 * | 9/2018 | ............ B60N 2/815 |
| FR | 3039472 B1 * | 9/2017 | ............ B60N 2/865 |
| JP | S6226010 A | 2/1987 | |
| JP | 2008265546 A | 11/2008 | |
| JP | 2008272270 A | 11/2008 | |
| KR | 20-1998-0029390 A1 | 8/1998 | |
| WO | WO-2006000266 A1 * | 1/2006 | .............. B60N 2/70 |
| WO | 2011/032702 A1 | 3/2011 | |
| WO | WO-2011032702 A1 * | 3/2011 | ............ B60N 2/888 |
| WO | WO-2014103044 A1 * | 7/2014 | ............ B60N 2/862 |
| WO | WO-2014103047 A1 * | 7/2014 | ............ B60N 2/818 |
| WO | WO-2016080763 A1 * | 5/2016 | .............. B60N 2/80 |
| WO | WO-2017148831 A1 * | 9/2017 | ............ B60N 2/862 |

\* cited by examiner

HEADREST FOR A VEHICLE SEAT AND SYSTEM FOR FORMING AN ALIGNMENT DEVICE WHICH CAN BE INTEGRATED IN A HEADREST

CROSS REFERENCE TO RELATED APPLICATIONS

This application is a United States National Phase Application of International Application PCT/EP2016/071803, filed Sep. 15, 2016, and claims the benefit of priority under 35 U.S.C. § 119 of German Application 10 2015 217 631.2, filed Sep. 15, 2015, the entire contents of which are incorporated herein by reference.

FIELD OF THE INVENTION

The invention relates to a headrest for a vehicle seat and to a modular system for forming an orienting device that is able to be integrated into a headrest.

BACKGROUND OF THE INVENTION

Headrests for vehicle seats are well known and serve, inter alia, to avoid any whiplash being suffered by a passenger in the event of an accident. For this purpose and to realize a comfort setting, it is therefore expedient for the headrest to be able to be positioned and locked individually depending on the height of each particular passenger. Orienting devices with the aid of which the headrest can be moved are known from the prior art. By means of the orienting device, for example a movement in translation in one direction or in several mutually independent directions is allowed in order to position the padded headrest as optimally as possible for the passenger.

SUMMARY OF THE INVENTION

It is an object of the present invention to further improve headrests compared with the prior art, for example with regard to the handling thereof.

The present invention achieves the object with a headrest for a vehicle seat, wherein the headrest is transferable in a reversible manner between a first latching position and a second latching position by way of a movement in translation, wherein the headrest has a shaft that rotates along with the movement in translation, wherein the shaft is connected to a latching element in the first latching position and in the second latching position, wherein the latching element is connected to the shaft via an elastic component.

Compared with the prior art, the headrest according to the invention comprises the elastic component, the restoring force or spring action of which ensures that the positioned and locked headrest is stabilized. For example, the spring action of the elastic component has the effect that the components of the headrest are pressed together in the first latching position, when the first latching position is an end position for the headrest. Moreover, as a result of its elastic action, the elastic component brings about a particular latching sensation when the end position is reached. Furthermore, the elastic component advantageously serves to return the headrest when, in the second latching position, an external force acts on the headrest without adjustment of the headrest being desired.

Preferably, the movement in translation is a movement with which the headrest is shifted in a direction parallel to the direction of travel. In this case, the first latching position is in particular an end position and the second latching position is a position of the headrest that is set individually by the passenger. Furthermore, provision is preferably made for the elastic component to clasp or engage around the shaft and for the elastic action to be brought about by partial twisting of the component in the direction of a direction of rotation of the shaft.

According to a further embodiment of the present invention, provision is made for the headrest to comprise an orienting device, wherein the orienting device comprises a translation unit for the movement in translation in a primary direction and/or a further translation unit for a further movement in translation in a secondary direction. As a result, the headrest can advantageously be moved both upward and downward and toward the front and toward the rear until the optimum position of the headrest is reached. Preferably, the primary direction and the secondary direction extend perpendicularly to one another. Provision is furthermore made for the orienting device to be assemblable in a modular manner and in this case for example to selectively have a motor-driven or manually operable translation unit and a motor-driven or manually operable further translation unit. As a result, the orienting device can be advantageously integrated into different models of headrests in different variants.

According to a further embodiment of the present invention, provision is made for the translation unit to be configured for manually carrying out the movement in translation and/or for the further translation unit to be configured for manually carrying out the further movement in translation.

According to a further embodiment of the present invention, provision is made for the translation unit to be configured for carrying out the movement in translation in a motor-driven manner and/or for the further translation unit to be configured for carrying out the further movement in translation in a motor-driven manner. As a result, the headrest can advantageously be shifted comfortably. In particular, provision is made for a drive provided for motorized driving to be connected to the shaft or a further shaft of the further translation unit and to drive the corresponding shaft.

According to a further embodiment of the present invention, provision is made for the elastic component to be configured in a conical manner. As a result of the shape of the elastic component, the restoring force or spring action of the elastic component can advantageously be adapted, for example to the geometric boundary conditions for the interaction between the latching element and the shaft.

According to a further embodiment of the present invention, provision is made for the translation unit to have a transmission for converting the movement in translation into a rotary movement of the shaft, wherein the transmission preferably has a gearwheel and a pivotable disk element (also referred to as disk segment) with a toothing.

According to a further embodiment of the present invention, provision is made for the further translation unit to have a transmission for converting the movement in translation into a rotary movement of the further shaft, wherein the transmission of the further translation unit preferably has a further gearwheel and a rack.

According to a further embodiment of the present invention, provision is made for the shaft to comprise a clamping pin or for a clamping pin to be arranged in continuation of the shaft. It has surprisingly been found, in an unexpected manner for a person skilled in the art, that, by means of the clamping pin, the latching sensation can advantageously be influenced.

A further subject of the present invention is a modular system for forming an orienting device that is able to be integrated into a headrest, in particular for a headrest according to the invention, wherein the system has

- a translation unit for reversibly transferring the headrest between a first latching position and a second latching position and
- a conversion unit for converting the movement in translation into a rotary movement of a shaft, which is connected via an elastic element to a latching element that latches in the first latching position and the second latching position.

Preferably, the conversion unit comprises a transmission comprising a gearwheel, a pivotable disk segment with a toothing, and/or a rack.

According to a further embodiment of the present invention, provision is made for the modular system to have a further translation unit, wherein the translation unit and/or the further translation unit is manually operable or has a motorized drive.

Further details, features and advantages of the invention can be gathered from the drawings and from the following description of preferred embodiments with reference to the drawings. In this case, the drawings illustrate merely exemplary embodiments of the invention which do not limit the concept of the invention.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
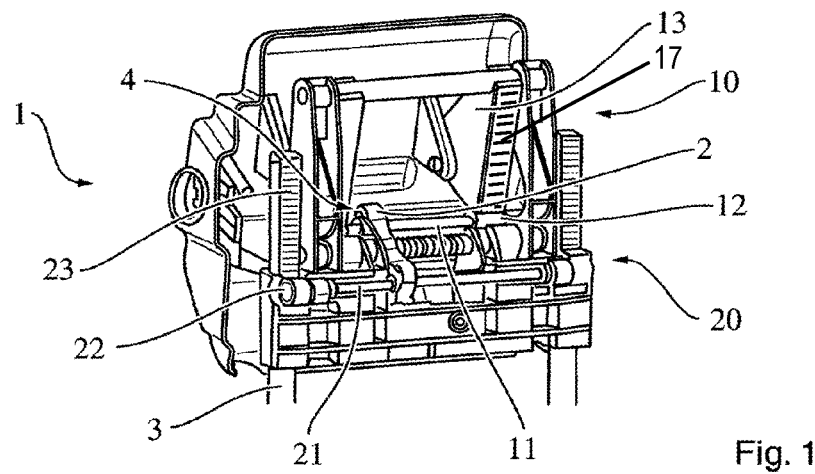
FIG. 1 is a perspective view showing a headrest for a vehicle according to a first exemplary embodiment of the present invention.

Referring to the drawings, In the various figures, identical parts are always provided with the same reference signs and are therefore each only mentioned once as a rule.

FIG. 1 schematically illustrates a headrest for a vehicle seat according to a first exemplary embodiment of the present invention. In this case, the headrest is intended to allow a passenger to comfortably support his head and also to protect the passenger from overextending his cervical vertebrae and possibly from an associated traumatic brain injury or nerve damage in the event of an accident. For flexibly settable and stable positioning of the headrest, it preferably comprises an orienting device 1, with the aid of which the headrest is positionable with respect to a main body, in particular a backrest, of the vehicle seat. In order to position the headrest as optimally as possible with respect to the head of the passenger, provision is preferably made for the orienting device 1 to have a translation unit 10 and/or a further translation unit 20, wherein the translation unit 10 is configured for a movement in translation of the headrest in a primary direction, in particular in a horizontally extending direction, i.e. in a Z direction, and the further translation unit 20 is configured for a further movement in translation of the headrest in a secondary direction, in particular in a vertically extending direction, i.e. in an X direction. In particular, the primary direction and the secondary direction extend perpendicularly to one another. In this case, a movement of the headrest in the direction of the passenger's head can preferably be realized by means of the translation unit 10 and height adjustment of the headrest by means of the further translation unit 20. Furthermore, provision is preferably made for the headrest to be able to be moved between a first latching position and a second latching position by means of the translation unit 10 and/or the further translation unit 20. For example, the second latching position is the position which is set individually by the passenger, and the first latching position is a position in which the headrest has been moved back fully. In order to lock the headrest, a latching element 2, for example a cam element, is provided in the orienting device 1, wherein the latching element 2 is latched, i.e. interacts in a form-fitting and/or force-fitting manner with a component of the headrest, in particular the orienting device, in the first latching position and the second latching position. As a result, the headrest is advantageously locked. In the exemplary embodiment illustrated in FIG. 1, the headrest is transferable manually between the first and the second latching position. To this end, the latching element 2 is released from the first and the second latching position, for example by the latching element 2 being displaced or lifted. Subsequently, the headrest can be moved or shifted manually from the outside by a force action. In particular, it is conceivable for the first translation unit 10 and the second translation unit 20 to share a common latching element 2. Upon the releasing of the latter, the headrest can then be moved in each case in translation both in the primary direction and in the secondary direction until the first or second latching position is taken up and the latching element is latched again, this being brought about for example by a restoring force of a spring element. Furthermore, provision is made for the translation unit 10 to have a shaft 11 and/or for the further translation unit 20 to have a further shaft 21, wherein the shaft 11 rotates along with the transfer, i.e. during the movement in translation of the headrest. For the conversion of the movement in translation into a rotary movement of the shaft 11 and for the conversion of the further movement in translation into a further rotary movement of the further shaft 21, a transmission is preferably provided in each case. In the case of the translation unit 10, the transmission comprises in particular a gearwheel 12 which is preferably integrated into the shaft 11 or is connected to the shaft 11, and a pivotable disk segment 13 with a toothing 17. The gearwheel 12 may include toothing 19 that is complementary to the toothing 17 of the pivotable disk segment 13. During the movement in translation, the disk segment 13 is pivoted and, via the transmission, drives the shaft 11 to perform the rotary movement. In the case of the further translation unit 20, the transmission comprises in particular a further gearwheel 22, which is preferably integrated into the further shaft 21 or connected to the further shaft 21, and a rack 23 which is preferably integrated into a carrier element 3 for the headrest or is connected to the carrier element 3 in a positionally fixed manner. In the event of a height adjustment, the further gearwheel 22 is moved along the rack 23 and in this way the further shaft 21 is driven. Furthermore, it is conceivable for the latching element 2, in order to block the rotary movement of the shaft 11, to interact with the shaft 11, in particular in a form-fitting manner, in the first latching position and/or second latching position. The same goes in particular also for the further shaft 21 and the common latching element. For the interaction of the shaft 11 and/or the further shaft 21 with the latching element 2, the shaft and/or the further shaft is provided with a contour that extends in particular along a longitudinal axis of the shaft 11 and/or further shaft 21 or runs at least partially around the latter. For example, the contour is edges of a polygonal cylinder. Furthermore, provision is made for the latching element 2 to be connected to the shaft 11 and/or the further shaft 21 in the first latching position and/or the second latching position via an elastic component 4, in particular via an elastic cone on the latching element 2. By means of the elastic action of the elastic component 4, the headrest can advantageously press against further components of the vehicle seat, for example against the carrier element 4, in the first latching position. Furthermore, a latching sensation can be brought about upon reaching an end position of the headrest. Furthermore, the action of the elastic component 4 causes a return of the headrest in the second latching position as soon as external forces act on the headrest, without any transfer into a different latching position being desired.

Preferably, the orienting device 1 is configured so as to be assembled in a modular manner, in order to be usable in different models of headrests. In the assembly for the orienting device 1 that is illustrated in FIG. 1, both the first translation unit 10 and the second translation unit 20 are provided for manually transferring the headrest.

Figure 2:
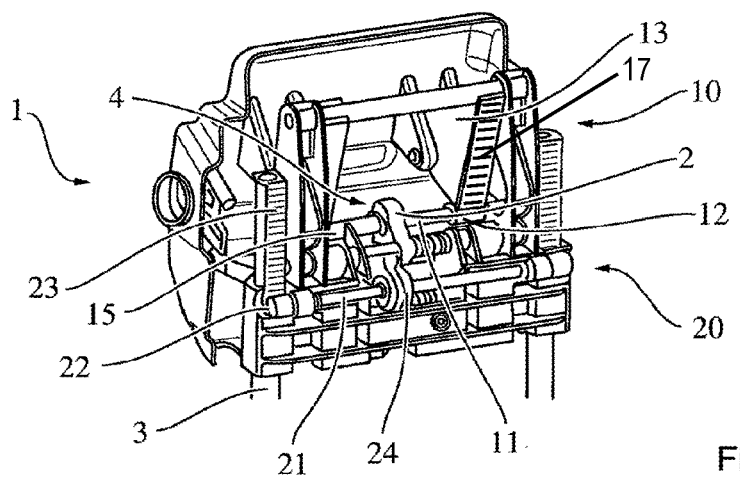
FIG. 2 is a perspective view showing a headrest for a vehicle according to a second exemplary embodiment of the present invention.

FIG. 2 schematically illustrates a headrest for a vehicle according to a second exemplary embodiment of the present invention. In this case, the headrest from FIG. 2 differs from the one illustrated in FIG. 1 essentially only in that, in the assembly of the orienting device 1 that is illustrated in FIG. 2, the translation unit 10 is intended for manual operation, while the further translation unit 20 is drivable in a motorized manner. To this end, a further drive 24 connected to the further shaft is provided. Furthermore, a clamping pin 15 is provided in the translation unit 10, in particular as part of the shaft 11 or as a continuation of the shaft 11. As a result, the latching sensations can advantageously be influenced.

Figure 3:
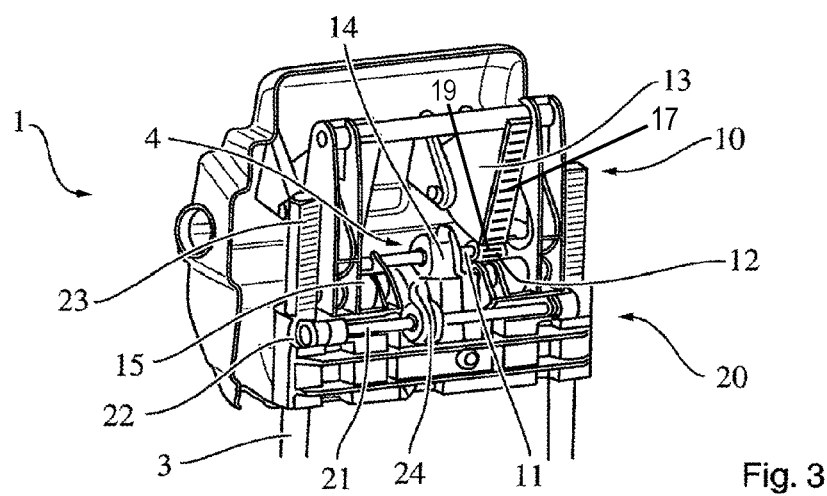
FIG. 3 is a perspective view showing a headrest for a vehicle according to a third exemplary embodiment of the present invention.

FIG. 3 schematically illustrates a headrest for a vehicle according to a third exemplary embodiment of the present invention. In this case, the headrest from FIG. 3 differs from the one illustrated in FIG. 1 essentially only in that, in the assembly of the orienting device 1 that is illustrated in FIG. 3, the translation unit 10 and the further translation unit 20 are drivable in a motorized manner. To this end, a drive 14 connected to the shaft 11 and the further drive 24 connected to the further shaft 21 are provided.

While specific embodiments of the invention have been shown and described in detail to illustrate the application of the principles of the invention, it will be understood that the invention may be embodied otherwise without departing from such principles.

The invention claimed is:

1. A headrest for a vehicle seat, the headrest comprising: a shaft, wherein the headrest is transferable in a reversible manner between a first latching position and a second latching position by way of a movement in translation, wherein the shaft rotates along with the movement in translation;
an elastic component;
a latching element, wherein the shaft is connectable to the latching element in the first latching position and in the second latching position and the latching element is connected to the shaft via the elastic component; and
an orienting device, wherein the orienting device comprises a first translation unit for movement in a primary direction and a second translation unit for movement in a secondary direction, wherein the first translation unit has a transmission for converting the rotary movement of the shaft into the movement of the first translation unit in the primary direction, wherein the transmission of the first translation unit has a gearwheel and a pivotable disk element with toothing complementary to toothing of the gearwheel, wherein the second translation unit has a transmission for converting the movement of the second translation unit into the rotary movement of an additional shaft allowing the second translation unit to move in the secondary direction, wherein the transmission of the second translation unit has an additional gearwheel and a rack.

2. The headrest as claimed in claim 1, wherein the elastic component engages around the shaft and the headrest is configured such that an elastic action is brought about by an at least partial twisting of the elastic component in a direction of a direction of rotation of the shaft.

3. The headrest as claimed in claim 1, wherein the transmission of the first translation unit is operably configured for converting the rotary movement of the shaft into movement in a horizontal direction; and
wherein the transmission of the second translation unit is operably configured for converting the rotary movement of the additional shaft into movement in a vertical direction.

4. The headrest as claimed in claim 3, wherein the first translation unit is configured for manually carrying out the movement in translation and/or the second translation unit is configured for manually carrying out the further movement in translation.

5. The headrest as claimed in claim 3, wherein the first translation unit is configured for carrying out the movement in translation as a motor-driven movement or wherein the second translation unit is configured for carrying out the further movement in translation as a motor-driven movement; or
wherein the first translation unit is configured for carrying out the movement in translation as a motor-driven movement and the second translation unit is configured for carrying out the further movement in translation as a motor-driven movement.

6. The headrest as claimed in claim 1, wherein the elastic component is configured to have a conical shape.

7. The headrest as claimed in claim 1, wherein the transmission of the first translation unit is operably configured for converting the rotary movement of the shaft into movement in a direction toward or away from a head of a user; and
wherein the transmission of the second translation unit is operably configured for converting the rotatory movement of the additional shaft for height adjustment movement.

8. The headrest as claimed in claim 1, wherein at least a portion of the rack is integrated with or connected to at least a portion of a carrier element; and
the rack has a plurality of teeth that are complementary to and meshingly engaged with at least a portion of a plurality of teeth of the gear wheel of the transmission of the second translation unit.

9. The headrest as claimed in claim 1, wherein the shaft comprises a pin or wherein the pin is arranged as a continuation of the shaft.

10. The headrest as claimed in claim 1, wherein the rotary movement of the shaft drives the first translation unit in the primary direction; and wherein the rotary movement of the additional shaft drives the second translation unit in the secondary direction which is different from the primary direction of the first translation unit.

* * * * *